(12) United States Patent
Kim

(10) Patent No.: US 9,770,998 B2
(45) Date of Patent: Sep. 26, 2017

(54) CONTROL METHOD AND SYSTEM FOR STARTING OF FUEL CELL VEHICLE

(71) Applicant: Hyundai Motor Company, Seoul (KR)

(72) Inventor: Dae Jong Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 37 days.

(21) Appl. No.: 14/811,112

(22) Filed: Jul. 28, 2015

(65) Prior Publication Data

US 2016/0121751 A1    May 5, 2016

(30) Foreign Application Priority Data

Oct. 29, 2014 (KR) .................. 10-2014-0148221

(51) Int. Cl.

| B60L 9/00 | (2006.01) |
|---|---|
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60L 11/18 | (2006.01) |

(52) U.S. Cl.
CPC ....... B60L 11/1885 (2013.01); *Y02T 10/7005* (2013.01)

(58) Field of Classification Search
CPC ........ B60L 11/1885; B60L 11/18; B60L 1/02; B60L 11/1868; B60L 1/003; B60L 11/1887; B60L 11/1894; B60L 11/1898; H01M 8/04007; H01M 8/0432; H01M 8/04626; H01M 8/0488; H01M 8/04268

USPC ....................................................... 701/1, 22
See application file for complete search history.

(56) References Cited

U.S. PATENT DOCUMENTS

| 5,648,182 A * | 7/1997 | Hara .................. H01M 8/0612 429/412 |
|---|---|---|
| 8,795,915 B2 * | 8/2014 | Imanishi ........... H01M 8/04268 429/429 |
| 8,835,065 B2 | 9/2014 | Burch et al. |
| 2006/0141309 A1 * | 6/2006 | Miyata .............. H01M 8/04007 429/429 |

(Continued)

FOREIGN PATENT DOCUMENTS

| JP | 2004-281219 A | 10/2004 |
|---|---|---|
| JP | 4432603 B2 | 3/2010 |

(Continued)

*Primary Examiner* — Jaime Figueroa
(74) *Attorney, Agent, or Firm* — Mintz Levin Cohn Ferris Glovsky and Popeo, P.C.; Peter F. Corless

(57) ABSTRACT

A control method and system for starting a fuel cell vehicle is provided. The method includes setting a first output power that is an output power required for driving the vehicle and beginning to increase the fuel cell temperature after setting the first output power. In addition, available output power of a fuel cell is estimated and a discharge power of a high-voltage battery is received. A second output power that is a sum of the available output power of the fuel cell and the discharge power of the high-voltage battery is calculated. The method further includes determining whether the second output power is greater than the first output power and determining whether starting of the vehicle is allowable based on the determination of whether the second output power is greater than the first output power.

15 Claims, 3 Drawing Sheets

(56) References Cited

U.S. PATENT DOCUMENTS

| | | | | |
|---|---|---|---|---|
| 2007/0199747 A1* | 8/2007 | Aoyagi | ............... | B60L 11/1861 |
| | | | | 180/65.31 |
| 2008/0081224 A1* | 4/2008 | Burch | ............... | H01M 8/04007 |
| | | | | 429/429 |
| 2009/0069963 A1* | 3/2009 | Kobayashi | .......... | B60L 11/1887 |
| | | | | 701/22 |
| 2010/0266916 A1* | 10/2010 | Imanishi | ........... | H01M 8/04268 |
| | | | | 429/429 |
| 2011/0020719 A1* | 1/2011 | Manabe | ............ | H01M 8/04589 |
| | | | | 429/429 |
| 2013/0103224 A1* | 4/2013 | Egami | ....................... | G05F 1/66 |
| | | | | 700/297 |
| 2013/0244125 A1* | 9/2013 | Wake | ................ | H01M 8/04097 |
| | | | | 429/415 |
| 2016/0141685 A1* | 5/2016 | Toida | ................ | H01M 8/04761 |
| | | | | 429/444 |

FOREIGN PATENT DOCUMENTS

| | | |
|---|---|---|
| JP | 2011-243326 A | 12/2011 |
| JP | 4916991 B2 | 4/2012 |
| JP | 2013-208001 A | 10/2013 |
| KR | 10-2004-0001776 A | 1/2004 |

* cited by examiner

CONTROL METHOD AND SYSTEM FOR STARTING OF FUEL CELL VEHICLE

CROSS REFERENCE TO RELATED APPLICATION

The present application claims priority of Korean Patent Application Number 10-2014-0148221 filed on Oct. 29, 2014, the entire contents of which application are incorporated herein for all purposes by this reference.

BACKGROUND

1. Field of the Invention

The present invention relates to a control method and system for starting of a vehicle that involves a vehicle starting control process to determine whether driving the fuel cell vehicle when starting the vehicle at low temperatures is possible.

2. Description of the Related Art

Since freezing of a fuel cell is predictable, when the temperature of the fuel cell is required to be increased before starting the vehicle, fuel cell vehicles perform a temperature-raising process. In particular, it is important to accurately determine a time at which the temperature-raising process will be completed. Conventional methods determine the completion of the temperature-raising process by estimating the temperature of the fuel cell at an air outlet thereof, or estimating a heat value generated within the fuel cell while the temperature of the fuel cell is increasing.

In some cases, however, when a vehicle is driven after the completion of the temperature-raising process, the fuel cell output power is limited and does not satisfy a driver demand due to the non-uniform cell voltages of the fuel cell. Additionally, a decrease in cell voltages may cause deterioration of the fuel cell. Conventional methods also exclude using a hybrid high-voltage battery, and do not reflect the fuel cell states changed by soaking time, an amount of frozen water within the fuel cell, and the like. Consequently, a starting process may be excessively delayed even though it may be possible to rapidly complete starting of a vehicle and to drive the vehicle. On the contrary, even though an internal state of the fuel cell is not ideal for driving the vehicle in the related art, starting of the vehicle may be completed. However, after the completion, the fuel cell may not output the required power.

The foregoing is intended merely to aid in the understanding of the background of the present invention, and is not intended to mean that the present invention falls within the purview of the related art that is already known to those skilled in the art.

SUMMARY

Accordingly, the present invention provides a control method and system for starting of a fuel cell vehicle to determine a time of completion of the starting by estimating the discharge power of a high-voltage battery and the available output power of a fuel cell when starting the vehicle at low temperatures. The low temperatures may range from −30 to 0° C.

In particular, the present invention teaches a technique of estimating the available output power of a fuel cell. This technique involves, when starting a vehicle at low temperatures, measuring the real-time stack performance while increasing the stack temperature and estimating available power that the stack may output at a specific lower bounding voltage. Specifically, when an operation for increasing the temperature of the vehicle is performed, a first available output power is estimated by analyzing the stack current-voltage performance based on the output power while the operation is being performed. Additionally, a second available output power is estimated by analyzing the fuel cell performance according to the temperature rise. Then, the available output power of the fuel cell may be estimated from the sum of the first and second available output power. Accordingly, the present invention provides a control method to rapidly and more safely determine the completion of the increase of the fuel cell temperature by using the available output power of the fuel cell and available output power of a high-voltage battery, which are more accurately estimated while the temperature of the fuel cell is being increased.

A control method for starting of a fuel cell vehicle according to the present invention may include: setting a first output power, which is an output power necessary for driving the vehicle; starting to increase the fuel cell temperature after setting the first output power; estimating the available output power of the fuel cell, receiving discharge power of a high-voltage battery, and calculating a second output power that is a sum of the available output power of the fuel cell and discharge power of the high-voltage battery; determining whether the second output power is greater than the first output power; and determining whether starting of the vehicle is allowable based on the determination of whether the second output power is greater than the first output power.

Before setting the first output power, the method may further include determining whether starting of the vehicle at low temperatures is possible based on ambient temperature measured by an ambient temperature sensor. The discharge power of the high-voltage battery may be received from a battery management system (BMS). In addition, the determination of whether starting of the vehicle is allowable, may include terminating the increase of the fuel cell temperature. After determining whether starting of the vehicle is allowable, the method may further include limiting an output power of the vehicle to the first output power during a predetermined time period.

According to the control method for starting the vehicle configured as described above, an unnecessary delay in starting may be prevented by determining the time at which starting of the vehicle may be completed based on states of a high-voltage battery and fuel cell, and low temperature start-ability and merchantability of the fuel cell vehicle may be improved. Further, a situation in which a fuel cell may not output required or sufficient power may be prevented since the starting of the vehicle may be completed even though the internal state of the fuel cell is not ideal for driving the vehicle. Consequently, a decrease in fuel cell durability may be avoided.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the tem "and/or" includes any and all combinations of one or more of the associated listed items.

Figure 1:
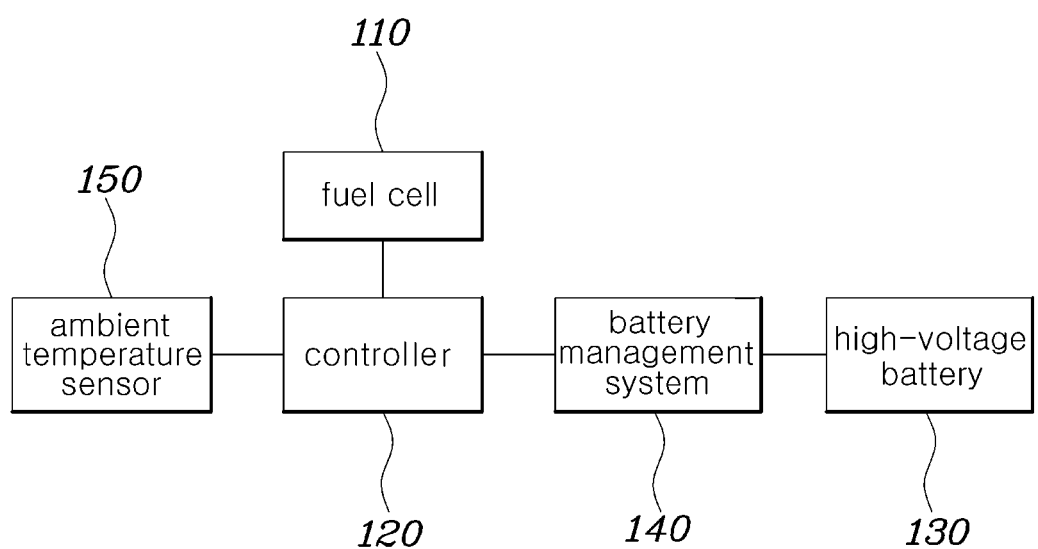
FIG. 1 is a block diagram illustrating a control device for starting a fuel cell vehicle according to an exemplary embodiment of the present invention.

In the following, a control device for starting a fuel cell vehicle according to an exemplary embodiment of the present invention will be described referring to the accompanying drawings. FIG. 1 is a block diagram illustrating a control device for starting a fuel cell vehicle according to an exemplary embodiment of the present invention.

Referring to FIG. 1, a control device for starting a fuel cell vehicle may include a fuel cell 110; a high-voltage battery 130 configured to charge and discharge electric power; and a controller 120 configured to begin increasing the temperature of the fuel cell after setting a first output power, which is an output power required for driving the vehicle, estimate available output power of the fuel cell 110 after beginning to increase the fuel cell temperature, calculate a second output power by receiving the discharge power of the high-voltage battery 130, determine whether the second output is greater than the first output, and determine whether starting of the vehicle is allowable based on determining whether the second output is greater than the first output, the second output power being a sum of the available output power of the fuel cell 110 and the discharge power of the high-voltage battery 130. Additionally, the present invention may include an ambient temperature sensor 150 configured to measure ambient temperature and a battery management system 140, configured to transmit the discharge power of the high-voltage battery 130 to the controller 120.

Figure 2:
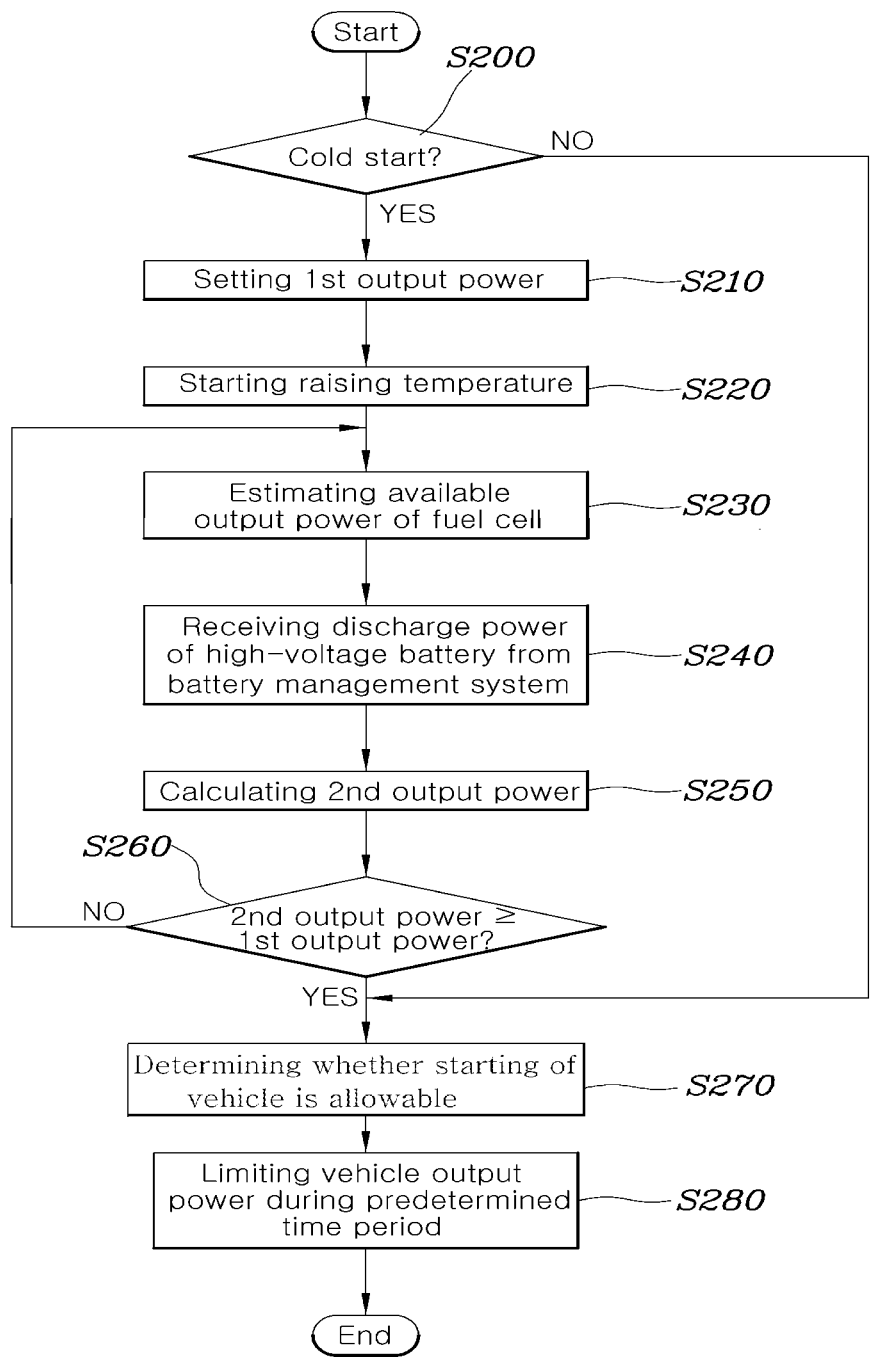
FIG. 2 is a flow diagram illustrating a control method for starting a fuel cell vehicle according to an exemplary embodiment of the present invention.
Figure 3:
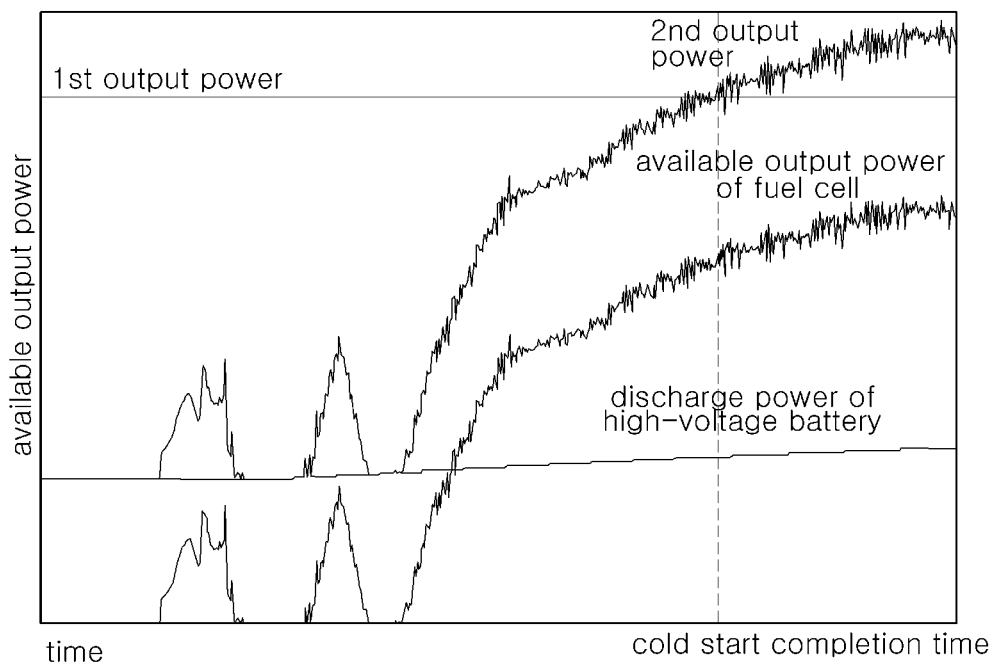
FIG. 3 is a graph illustrating a variance in available output power of a high-voltage battery and fuel cell over time according to an exemplary embodiment of the present invention.
Figure 4:
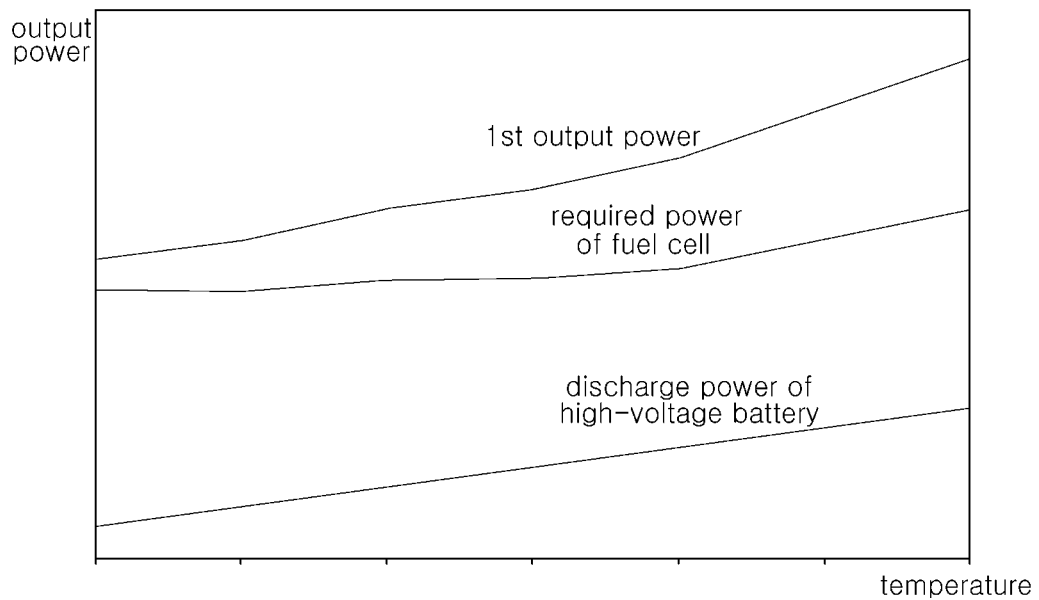
FIG. 4 is a graph illustrating variances in the discharge power of a high-voltage battery, required output power of a fuel cell, and first output power, with temperatures according to an exemplary embodiment of the present invention.

In the following, a control method for starting a fuel cell vehicle according to an exemplary embodiment of the present invention will be described referring to the accompanying drawings. FIG. 2 is a flow diagram illustrating a control method for starting a fuel cell vehicle according to an exemplary embodiment of the present invention, and FIG. 3 is a graph illustrating a variance in available output powers of a high-voltage battery and fuel cell over time according to an exemplary embodiment of the present invention. FIG. 4 is a graph illustrating variances in the discharge power of a high-voltage battery, required output power of a fuel cell, and first output power with temperatures according to an exemplary embodiment of the present invention.

Referring to FIGS. 2 to 4, the control method for starting a fuel cell vehicle may include setting a first output power, which is an output power required for driving the vehicle (S210); beginning to increase the fuel cell temperature (S220) after setting the first output power (S210); after beginning to raise the fuel cell temperature (S220), estimating the available output power of the fuel cell (S230), receiving a discharge power of a high-voltage battery (S240), and calculating a second output power, which is a sum of the available output power of the fuel cell and the discharge power of the high-voltage battery (S250); determining whether the second output power is greater than the first output power (S260); and determining whether starting of the vehicle is allowable (S270) based on the determination of whether the second output power is greater than the first output power (S260).

Further, the increasing of the fuel cell temperature may be performed by supplying hydrogen and air to the fuel cell. The first output power may be a predetermined output power based on an ignition temperature. When a vehicle start intention is present, the controller may be configured to measure the ignition temperature and determine the first output power based on the measured ignition temperature (S210). In particular, the first output power may increase as the ignition temperature increases.

As described above, the available output power of the fuel cell may be set to a sum of a value analyzing stack current-voltage performance based on the output power while increasing the fuel cell temperature and a value analyzing fuel cell performance based on the output power while increasing the fuel cell temperature. Accordingly, the available output power of the fuel cell may be more accurately estimated. The available output power of the fuel cell may increase with time after increasing of the temperature begins, as shown in FIG. 3. The required output power of the fuel cell illustrated in FIG. 4 may be an available output power of the fuel cell required for completion of the starting of the vehicle based on the ignition temperature. In other words, more fuel cell output power may be required as the ignition temperature increases.

The discharge power of the high-voltage battery may be received from the battery management system. As the high-voltage battery is continuously charged with the output power of the fuel cell, generated during the increasing of the fuel cell temperature, the discharge power of the high-voltage battery may steadily increase and contribute to the first output power, required for driving the vehicle. Consequently, when the second output power, which is a sum of the available output power of the fuel cell and the discharge power of the high-voltage battery, is less than the first output power, the controller may be configured to determine that output power of the high-voltage battery and fuel cell stack has not reached the output power required for driving the vehicle, and may thus be configured to continuously increase the fuel cell temperature and estimate the available output power of the fuel cell (S230). When the second output power is greater than the first output power, the controller may be configured to determine that the output power of the high-voltage battery and fuel cell stack is sufficient to drive the vehicle and thus may be configured to determine whether starting of the vehicle is allowable (S270). In other words, whether starting of the vehicle is allowable may be based on a determination of whether the second output power is greater than the first output power. In determination of whether starting of the vehicle is allowable (S270), the increasing of the fuel cell temperature may be termination to prevent unnecessary consumption of output power.

As shown in FIG. 3, the time at which the second output power reaches the first output power may be known as the completion time of a cold start (e.g., starting the vehicle at low temperatures). The completion time of a cold start may be less than when determining the completion of the cold start based on the temperature of the air outlet of the fuel cell. Additionally, before the determination of the first output power (S210), the method may include determining whether a cold start is possible based on the ambient temperature measured by the ambient temperature sensor (S200).

For example, when the ambient temperature measured by the ambient temperature sensor is less than a predetermined temperature, the controller may be configured to determine a cold start condition and determine the first output power (S210). Further, when the measured ambient temperature is the predetermined temperature or greater, the controller may be configured to determine a normal start condition and determine whether starting of the vehicle is allowable (S270). Accordingly, whenever starting a vehicle, the estimation of the output power of the high-voltage battery and fuel cell may not be performed, and thus a time delay due to unnecessary control for increasing the fuel cell temperature may be prevented.

Moreover, the present invention may further include limiting the output power of the vehicle to the first output power during a predetermined time period (S280) after determining whether starting of the vehicle is allowable (S270). In other words, since a vehicle may initially output power less than the first output power, after increasing the fuel cell temperature and starting the vehicle, limiting the output power of the vehicle as described above may prevent a drop (e.g., a decrease) in fuel cell performance and deterioration of the fuel cell.

According to a control method for starting of a fuel cell vehicle configured as described above, an unnecessary delay may be prevented by determining the time required to start the vehicle based on the states of the high-voltage battery and fuel cell, and start-ability of the fuel cell vehicle at low temperatures may be improved thus increasing the commercial value of the vehicle. Further, it may be possible to prevent a situation in which a fuel cell may not output required power since the starting of a vehicle has been completed even though an internal state of the fuel cell is not ideal for driving the vehicle. Consequently, a decrease in fuel cell durability may be prevented.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A control method for starting a fuel cell vehicle, comprising:
   setting, by a controller, a first output power, which is an output power required for driving;
   beginning, by the controller, to increase the fuel cell temperature after setting the first output power;
   calculating, by the controller, a second output power by estimating available output power of a fuel cell and receiving a discharge power of a high-voltage battery, the second output being a sum of the available output power of the fuel cell and discharge power of the high-voltage battery;
   determining, by the controller, whether the second output power is greater than the first output power; and
   determining, by the controller, whether starting of the vehicle is allowable based on the determination of whether the second output power is greater than the first output power.

2. The method of claim 1, further comprising:
   determining, by the controller, whether starting of the vehicle at low temperatures is possible based on an ambient temperature measured using an ambient temperature sensor before setting the first output power.

3. The method of claim 1, wherein the discharge power of the high-voltage battery is received from a battery management system.

4. The method of claim 1, wherein the determination of whether starting of the vehicle is allowable terminates the increase of the temperature of the fuel cell.

5. The method of claim 1, further comprising:
   limiting, by the controller, output power of the vehicle to the first output power during a predetermined time period after determining whether starting of the vehicle is allowable.

6. The method of claim 2, further comprising:
   determining, by the controller, a cold start condition when the ambient temperature measured by the ambient temperature sensor is less than a predetermined temperature.

7. A control system for starting a fuel cell vehicle, comprising:
   a memory configured to store program instructions; and
   a processor configured to execute the program instructions, the program instructions when executed configured to:
      set a first output power, which is an output power required for driving;

begin to increase the fuel cell temperature after setting the first output power;

calculate a second output power by estimating available output power of a fuel cell and receiving a discharge power of a high-voltage battery, the second output being a sum of the available output power of the fuel cell and discharge power of the high-voltage battery;

determine whether the second output power is greater than the first output power; and determine whether starting of the vehicle is allowable based on the determination of whether the second output power is greater than the first output power.

8. The system of claim 7, wherein the program instructions when executed are further configured to:

determine whether starting of the vehicle at low temperatures is possible based on an ambient temperature measured using an ambient temperature sensor before setting the first output power.

9. The system of claim 7, wherein the discharge power of the high-voltage battery is received from a battery management system.

10. The method of claim 7, wherein the determination of whether starting of the vehicle is allowable terminates the increase of the temperature of the fuel cell.

11. The method of claim 7, wherein the program instructions when executed are further configured to:

limit output power of the vehicle to the first output power during a predetermined time period after determining whether starting of the vehicle is allowable.

12. A non-transitory computer readable medium containing program instructions executed by a controller, the computer readable medium comprising:

program instructions that set a first output power, which is an output power required for driving;

program instructions that begin to increase the fuel cell temperature after setting the first output power;

program instructions that calculate a second output power by estimating available output power of a fuel cell and receiving a discharge power of a high-voltage battery, the second output being a sum of the available output power of the fuel cell and discharge power of the high-voltage battery;

program instructions that determine whether the second output power is greater than the first output power; and program instructions that determine whether starting of the vehicle is allowable based on the determination of whether the second output power is greater than the first output power.

13. The non-transitory computer readable medium of claim 12, further comprising:

program instructions that determine whether starting of the vehicle at low temperatures is possible based on an ambient temperature measured using an ambient temperature sensor before setting the first output power.

14. The non-transitory computer readable medium of claim 12, wherein the discharge power of the high-voltage battery is received from a battery management system.

15. The non-transitory computer readable medium of claim 12, wherein the determination of whether starting of the vehicle is allowable terminates the increase of the temperature of the fuel cell.

* * * * *